United States Patent
Leitner

[11] 3,871,088
[45] Mar. 18, 1975

[54] CLAMP OF RESILIENT MATERIAL ROTATABLE IN A CIRCULAR HOLE

[76] Inventor: Kajetan Leitner, am Winacker 18, 817 Bad Tolz, Germany

[22] Filed: Oct. 25, 1973

[21] Appl. No.: 409,473

[30] Foreign Application Priority Data
Oct. 27, 1972 Germany.............................. 2221075

[52] U.S. Cl. .............................. 24/81 B, 248/74 A
[51] Int. Cl. .......................... A44b 21/00, F16l 3/00
[58] Field of Search ........... 403/384, 397, 240, 241; 24/73 RM, 73 AS, 73 SA, 73 B, 81 B; 248/74 A, 71, 73

[56] References Cited
UNITED STATES PATENTS

| | | | |
|---|---|---|---|
| 2,068,932 | 1/1937 | Quarnstrom...................... | 24/73 SA |
| 2,454,894 | 11/1948 | Tatom............................... | 24/73 SA |
| 2,961,479 | 11/1960 | Bertling........................ | 248/74 A X |
| 3,154,277 | 10/1964 | Becker........................... | 24/73 SA X |
| 3,317,167 | 5/1967 | Becker et al.......................... | 248/73 |
| 3,437,298 | 4/1969 | Seckerson..................... | 248/74 A X |
| 3,497,923 | 3/1970 | Seckerson.......................... | 24/81 B |

FOREIGN PATENTS OR APPLICATIONS
546,146   6/1942   Great Britain ..................... 24/73 B

*Primary Examiner*—Donald A. Griffin
*Attorney, Agent, or Firm*—Anthony A. O'Brien

[57] ABSTRACT

A clamp is disclosed as being made of resilient material and having opposed arms with a crossbar interconnected to the opposed arms, wherein a plurality of opposed slots in the crossbar and arms at one end of the clamp are receivable in a hole of a structural part so as to rotatably engage the clamp to the structural part, wherein a plurality of opposed perforations in the arms at the other end of the clamp are arranged to receive and clampingly engage a rod-type structure extending between the arms, and wherein at least two cuts or incisions of various shapes may be interposed between the clamp ends and between the pluralities of slots and perforations.

9 Claims, 10 Drawing Figures

CLAMP OF RESILIENT MATERIAL ROTATABLE IN A CIRCULAR HOLE

The invention relates to a clamp of resilient material, rotatable in a circular hole, preferably for fixing rod type structures, such as Bowden cables, rod systems or the like, to sheet type components.

Known fixing means of this kind comprise a nipple passing through the circular hole and carrying at one end some kind of axial securing device, for example a flange or a securing ring engaged in a groove. At its other end the nipple has a transverse bore to accommodate the rod type structure, which is then clamped fast by a screw which can be screwed axially into the nipple from this end. A structural element of this kind is, considered from the point of view of mass production, a comparatively expensive component, which furthermore is not entirely safe as the screw can work loose, if it is not additionally secured. Moreover the component also requires a plurality of grip-handles for fitting it in position, which again represents a serious disadvantage for rationalized production methods.

The object of the invention is to simplify such a component constructionally, designing it in such a way that no screwing at all is required in applying it and furthermore the number of handholds neccessary is reduced to two, namely on the insertion in the circular hole of the sheet or panel type component and the introduction of the rod type structure.

This is attained in accordance with the invention by making the clamp of substantially V-shaped cross-section with two arms and a crossbar connecting them, the arms each forming two clips, of which one clip, corresponding to the thickness of the component, has slots for accommodating the component extending transversely to the clamp, and the arms of the other clip are provided with perforations for passing the rod type structure through, in which the rod type structure is firmly clamped.

The construction described above of the clamp in accordance with the invention makes it possible to stamp it out of flat material or a springy or resilient nature, for example strip steel, and bend it into the V-shape. This latter shape is particularly advantageous as it does not call for any complicated bending tool. To form the V-shape all that is necessary is to press a suitable sheet component into a corresponding recess. For the requisite insertion in a circular hole the V-shape offers furthermore the advantage of having the favourable property of permitting insertion in the circular hole without any bending-round in its inner zone, so that correspondingly small circular holes can be utilized for accommodating the clamp in accordance with the invention. The division into two clips, namely the component clip and the rod clip, leads to the specially advantageous result that two holding systems acting independently of one another are provided, although considering the form of the clamp, namely its V-shape, an apparently unitary and hence correspondingly easily manufactured component is obtained. Basically therefore for both systems it is only a matter of a forming operation. The component clip is easy to engage in the circular hole in the sheet or panel type component, while a clamping member is obtained for the rod type structure whose arms act in opposed directions on the said rod type structure and thus clamp this more securely.

To effect the connection between the component and the clamp, the latter is given a corresponding preliminary stressing, resulting, after the insertion of the clamp in a circular hole, in an automatic spreading apart of the arms and thus to the reception of the component in the slot.

The perforations may advantageously be provided with resilient lugs projecting into them, and capable of being bent so far out of the perforations that the rod type structure can be slipped into the perforations and when the lugs spring back they clamp the said rod type structure fast. With this construction the resilient lugs take over the duty of clamping the rod type structure in the perforations, in which connection the clamp inserted in the circular hole can also be somewhat compressed there, without the clamping action of the resilient lugs being deleteriously affected by this.

It is however also possible to part the arms of the clamp in each case by incisions or cuts in the two clips extending transversely to the clamp, each of which is elastically deformable independently of the other, and to provide the arms of the rod clip with holes for passing the rod type structure through, the width of which holes is such that when the arms are pressed together the rod type structure can be pushed in the holes and as the arms spring apart again it is clamped firmly.

The holes provided for receiving the rod type structure are preferably made as oblong or slotted holes with three zones of different widths, of which an outer zone effects the clamping, the other outer zone is of such a width that when the clamp is in the slackened condition the rod type structure can be inserted in both holes, and the intermediate zone is narrower than the two outer zones, the narrowing or constriction nevertheless permitting, when the arms are pressed together, a displacement of a rod type structure from one outer zone to the other. In this way there is made possible a convenient method of fitting the rod type structure, which is, that is to say, merely first of all inserted in the holes, that is to say in the zone with the greatest width, after which the clamp is compressed so that the rod type structure can be moved into the zone effecting the clamping. There it is then held fast, as between the said outer zones there is the abovementioned constriction. If therefore the clamp with the taken-up rod type structure is only once released from stress, then the holes also hold the rod type structure securely, as it is impossible without external assistance to move the rod type structure away past the constriction without compressing the clamp again.

If the holes in the region of the zone of the width effecting the clamping, are formed in such a way that they are bounded by three sides which in extension form a triangle, then there is obtained a particularly effective locking of the clamp and rod type structure, as in the latter the edges of the zone concerned dig in to the rod type structure at three places.

The rotability of the clamp in relation to the sheet or panel type component can be facilitated if the slots provided for accommodating the sheet or panel type component have lugs bent into them, which lugs starting from the ends of the slots are bent into these and give the slot ends an inwardly directed rounding-off, in which connection the ends of the lugs, when the clamp is fitted in position, do not touch the wall of the circular hole in the sheet or panel type component. The bent-in lugs form an inwardly directed rounded surface, which can be satisfactorily flexibly adapted to the inner rim of the circular hole, so that only a slight friction exists there between clamp and component.

In order not to overload the clamp, from the point of view of its resilient properties, when the arms are pressed together for the insertion of the rod type structure, it is advisable to bend over the ends of the arms inwardly. In this way stops are obtained which restrict the compression of the arms correspondingly.

As mentioned above, cuts or incisions are used to separate component clip and rod clip, which render the rod clip and component clip to a large extent independent of one another in respect of the springing or resilient forces acting on the arms. This independency of the two clips can be increased even further if the incisions are made as slots and for the purpose of forming a widened resiliency zone terminate in bent-over portions, oriented in the longitudinal direction of the clamp. From the longitudinal direction these slots can run out again substantially into the arms of the clamp. In this way there is obtained between the bends a comparatively narrow zone of the clamp in the form of the abovementioned crossbar, which when the arms of a clip are pressed together or sprung together, practically completely absorbs the forces thereby produced and in any case does not transmit them to the other clip. This transmission can also be prevented if, with the slot type incisions and substantially straight formation in the zone of the crossbar, a further slot is provided cutting through them and disposed adjacent to the said incisions. There is thus likewise obtained a comparatively narrow zone in which the resiliency or springing forces occurring when a clip is compressed together or allowed to spread out, are practically completely absorbed.

In what follows the invention is explained with reference to the Figures. In these:

Figure 1:
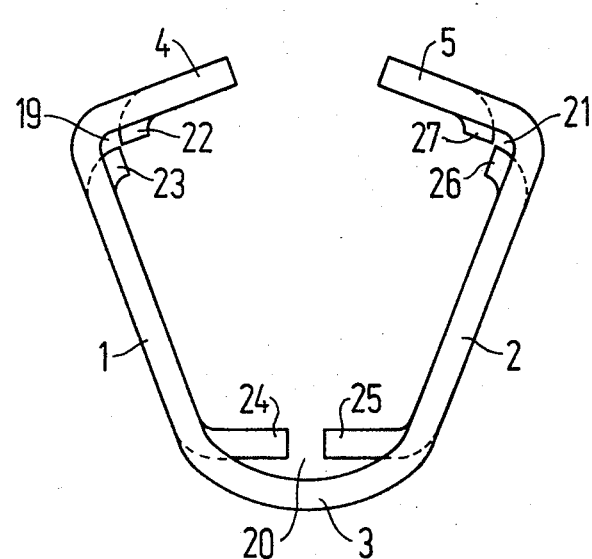
FIG. 1 shows the clamp alone in axial plan view.
Figure 5:
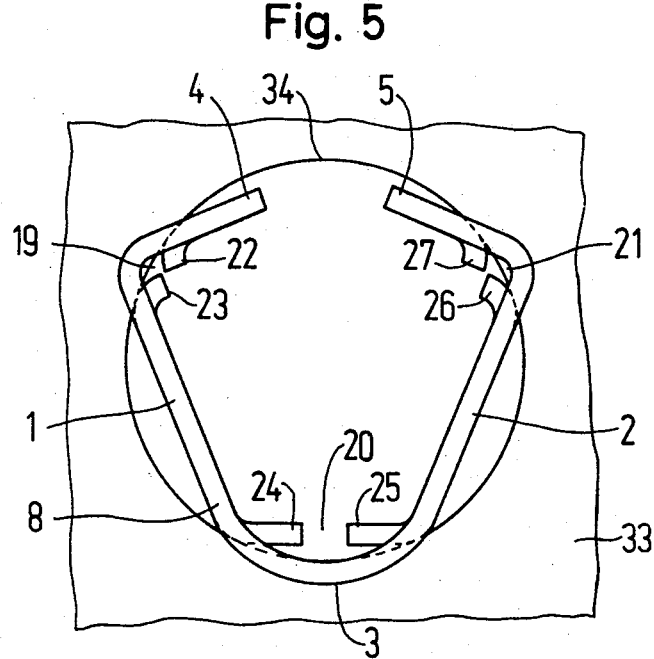
Figure 6:
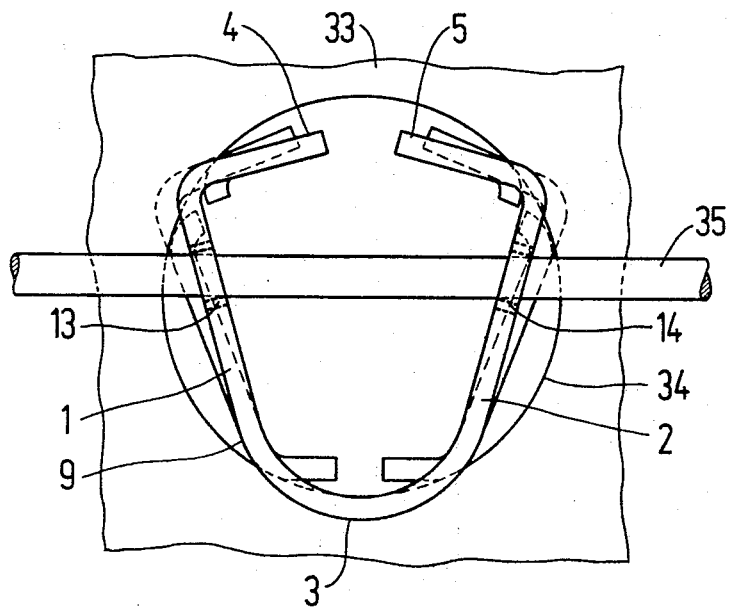
Figure 7:
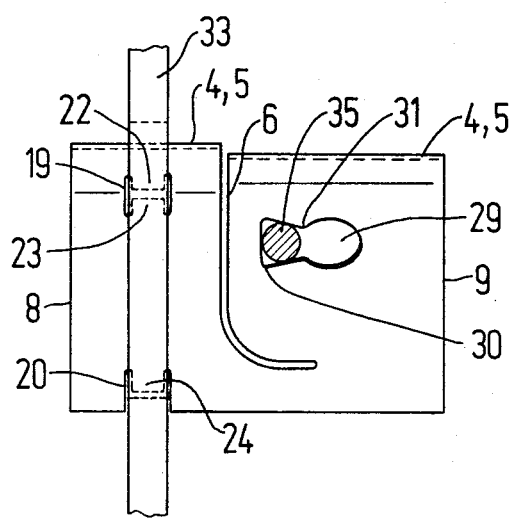
Figure 8:
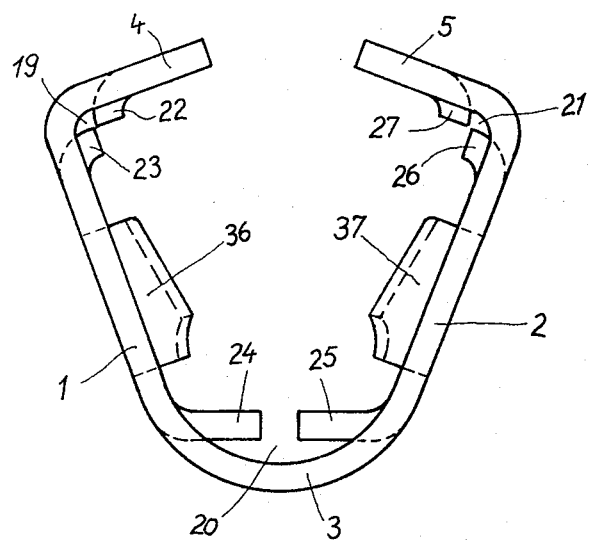
Figure 9:
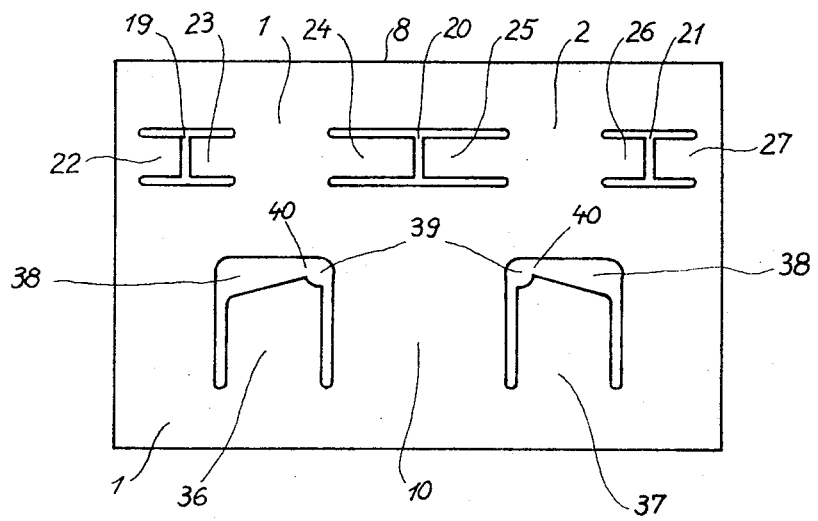
Figure 10:
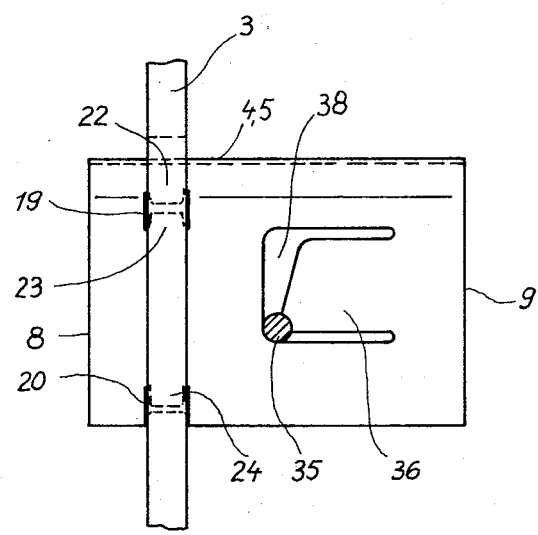

FIG. 5 shows the clamp of FIG. 1 inserted in a sheet or panel type component, with the component clip visible, FIG. 6 shows the arrangement as in FIG. 5, but this time however with the rod clip shown with the rod type structure firmly clamped, FIG. 7 shows the arrangement as in FIGS. 5 and 6 together with the sheet type component in side elevation, FIG. 8 shows a clamp with resilient lugs in the perforations for receiving the rod type structure, FIG. 9 shows the same clamp viewed from below, and FIG. 10 shows the same clamp inserted in a sheet type component firmly clamped.

FIG. 1 shows, as an example of embodiment, a clamp viewed in the axial direction. The clamp is substantially V-shaped and has two arms 1 and 2, interconnected by the arcuate component 3. At their ends the arms 1 and 2 have bent-over portions 4 and 5, directed inwardly. These bent portions 4 and 5 form stops for the compression together of the arms 1 and 2, so that when this takes place a given travel of these arms cannot be exceeded. In this way any overloading prejudicial to the resiliency properties, particularly of the arcuate component 3, is avoided.

Figure 2:
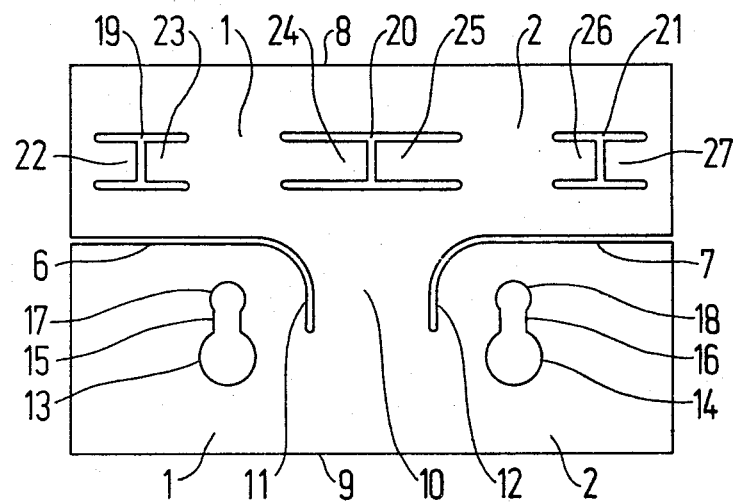
FIG. 2 shows the development of this clamp.

In FIG. 2 is represented the development of the clamp of FIG. 1. It can be seen from this developed view that the clamp is divided into two parts by slots 6 and 7, namely the component clip 8 and the rod clip 9. Thanks to these slots 6 and 7 it is ensured that with the finished formed clamp, as represented in FIG. 1, the pressing together of the arms 1 and 2 either of the component clip 8 or of the rod clip 9 has practically no effect on the other clip concerned, as the resiliency forces here occurring are substantially taken up in the central zone of the clamp, that is to say the crossbar 10, and this transmits practically none of the resiliency stresses occurring to the other clip concerned. This action of the crossbar 10 is further assisted here in a special manner, in that the slots 6 and 7 terminate in bent-over portions 11 and 12, oriented substantially in the longitudinal direction of the clamp. Out of the longitudinal direction these slots can run out again substantially into the arms of the clamp. In this way the zone of the crossbar 10 is further specially mechanically defined.

In the zone of the rod clip 9 holes 13 and 14 are provided for the insertion of the rod type structure. These holes are here of the elongated type with three zones of varying width. The largest of these zones are the said holes 13 and 14, through which in assembly the rod type structure is simply pushed. These holes 13 and 14 are made correspondingly wide for this purpose. In the centre there is then a narrowing or constriction 15 and 16, which causes a catch-engagement of the inserted rod type structure. That is to say for clamping fast this is moved out of its position in the holes 13 and 14 into the wide zones 17 and 18, where it is then prevented from slipping back into the holes 13 and 14 after the release from compression of the clamp, by the constriction 15 or 16. The constriction 15 and 16 and also the wide zones 17 and 18 are each of such a width that when the arms 1 and 2 are pressed together an inserted rod type structure can be displaced without difficulty. If however the clamp is released then the rod type structure is clamped fast in the wide zones 17 and 18, as these are only slightly larger in size than the rod type structure.

There is provided for the rotatable securing of the clamp to a sheet type component the component clip 8, in which are stamped out the slots 19,20 and 21. The wall of the circular hole in the sheet type component engages in these slots, as is further explained in more detail below, with reference to FIG. 5. Lugs 22 and 23, 24 and 25, 26 and 27 are each bent by their ends into the slots 19,20 and 21 respectively. Because of the bending-in of these lugs there is obtained in each case at the ends of the slots 19,20 and 21 a rounding-off or rounded portion which is applied against the inner wall of the circular hole in the sheet or panel type component and consequently only allows a slight friction to occur when the clamp is rotated in relation to the sheet type component.

Figure 3:
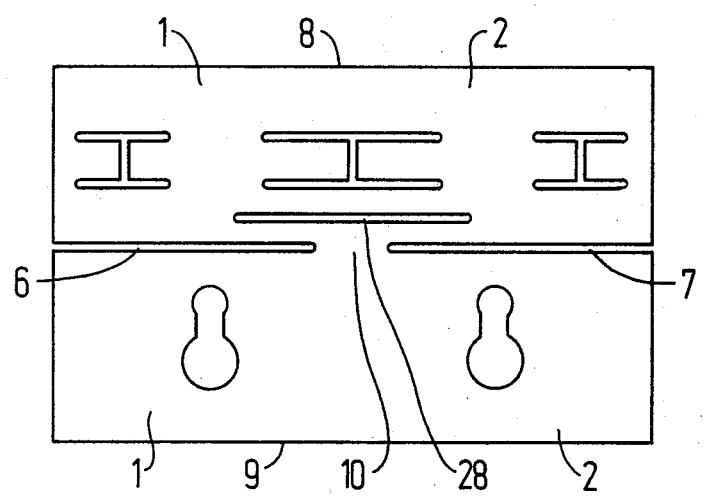
FIG. 3 shows the development of a slightly varied version of the clamp.

In the example of embodiment represented in FIG. 3 there is provided, for the purpose of preventing too fierce an engagement by the resiliency stresses of the component clip 8 on the rod clip 9 or vice versa, a variant construction. Here the slots, cuts or incisions 6 and 7 extend from the exterior substantially rectilinearly in the clamp. Next to the ends of the slots 6 and 7 a further slot 28 is provided, projecting beyond the ends of the slots 6 and 7. There is thus formed a transverse web or crossbar 10 connecting the component clip 1 and the rod clip 9 and forking to some extent between the slots 6 and 28, or 7 and 28 respectively, so that there the springing or resiliency forces acting on one of the two clips are absorbed practically completely and are not transmitted to the other clip concerned. The other elements of the clamp represented in FIG. 3 correspond to those as in FIG. 2.

Figure 4:
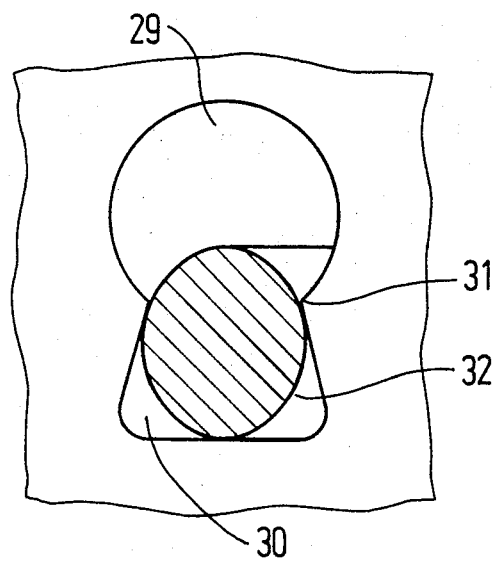
FIG. 4 shows the construction of the hole for receiving the rod type structure.

In FIG. 4 is represented a variant version of a hole for receiving a rod type structure. The three width zones here consist of the relatively large aperture 29, which extends to develop into the jutting-out throat 30, in the form substantially of an acute-angled triangle. Thanks to this construction there is formed in the centre a constriction 31 so that a rod type structure once received by the throat 30 can no longer slip back into the aperture 29 when the clamp is released from pressure. The arrangement for locking a rod type structure in the jutting-out throat 30 is here particularly effective, as the rod type structure is only gripped at three points of its outer surface, namely at the points where the sides of the triangle formed by the jutting-out throat 30 come into contact with the rod type structure. A rod type structure 32 seated in the throat 30 is represented in section, the section plane lying in the plane of the arm concerned. There is thus obtained an elliptical section, since because of the force exerted by the arm concerned on the rod type structure, this latter traverses the arm obliquely.

In FIG. 5 is shown how the clamp represented in FIG. 1 appears when assembled with a sheet or panel type component 33. The component 33 has a circular hole 34 in which the clamp is inserted in such a way that the inner wall of the circular hole 34 engages in the slots 19,20 and 21. In these circumstances the parts concerned of the arms 1 and 2 and the bent-over portions or flanges 4 and 5 lie above the component 33 and are therefore visible. Underneath the component 33 the same parts are then again adjacent.

FIG. 5 shows clearly that the rounded portions at the ends of the slots 19,20 and 21, resulting from the bending-out of the lugs 22 and 23, 24 and 25, 26 and 27, offer a low-friction bearing in respect of the component 33, so that the inserted clamp can easily be rotated in respect of the said component.

In FIG. 6 the same clamp is represented in assembly with the component 33, but here in plan view on the rod clip 9. The component clip 8 visible in FIG. 5 is omitted in FIG. 6 for the sake of clearness. The arrangement in FIG. 6 is obtained therefore by viewing the arrangement in FIG. 5 from behind seen through the plane of the drawing, the parts belonging to the component clip being however omitted.

As can be seen from FIG. 6, here the arms 1 and 2 of the rod clip 9 represented are pressed together so that they have an inherent spring stress which tends to spread them apart. The rod 35 is inserted through the holes in the arms 1 and 2 and is clamped fast therein under the action of the spring tension of the said arms 1 and 2. The holes 13 and 14 are indicated in dashed line.

FIG. 7 shows the assembly represented in FIGS. 5 and 6 in side elevation. The sheet or panel type component 33 engages by its circular hole in the slots 19 and 20 here visible and in which the lugs 22,23 and 24 project. When the arms of the rod clip 9 are pressed together its flanges 4 and 5 project slightly higher beyond the flanges 4/5 of the component clip 8. The arms of the rod clip thus appear somewhat longer. The rod 35 is clamped firmly in the jutting-out throat 30.

The clamp represented makes it possible to hold a rod type structure, as for example the rod 35, securely, while nevertheless the securing arrangement remains rotatable in relation to a sheet or panel type component, here that is to say the component 33. A pull can then be exerted on the rod 35 is different directions, the clamp automatically adjusting itself by rotation in respect of the plate 33 to the direction of pull in question. The same also applies to a compressive stressing of the rod 35.

In the case of the clamp represented in FIGS. 8 and 9 it is a question of a different kind of perforation for receiving the rod type structure. Otherwise the clamp is constructed in principle exactly as in the case of the clamp represented in FIGS. 1 and 3. Thus for example the clamp shown in FIGS. 8 and 9 also possesses the slots 19,20 and 21 in which the wall of the circular hole of a sheet or panel type component engages. The clamp in accordance with FIGS. 8 and 9 does not however have any slots for separating the component clip 8 and rod clip 9, as this form of embodiment does not require any independence of the two clips from one another during the elastic deformation of the component clip. The stress for clamping a rod type structure is applied here that is to say by the resilient lugs 36 and 37, which project into the perforations 38. These lugs 36 and 37 are set obliquely inwards in the V-shaped clamp. In this connection the free ends of the lugs 36 and 37 are directed towards the plate 35 held by the slots 19,20 and 21. The space stamped out and left free in front of the lugs 36 and 37 is given such dimensions that it has at one end the perforation 38 which is larger than the diameter of a rod type structure 35 to be clamped (see FIG. 10). Here the perforation 38 narrows inwardly up to a narrow point 40, or restriction point, behind which lies the port 39 for accommodating the rod type structure.

The fitting of a rod type structure 35 in the clamp is effected as follows (see in this connection FIG. 10): The rod or wire 35 is first pushed through the perforations 38. After this the two resilient lugs 36 and 37 are pushed with a pair of pliers so far out of the perforations 38 that these widen out, which means that the wire 35 can be pushed without hindrance via the restriction point 40 into the port 39, where it comes to rest. After releasing from the nippers the lugs 36 and 37 spring back and clamp the wire 35 firmly.

In the case of a tensile or compressive stressing of the wire 35 a lug 36 or 37 respectively takes over the duty of clamping the wire, that is to say the one which tends to open further under the load taken up the "v" of the clamp, which however is prevented by the bore or aperture (34 in FIG. 6) in the sheet type component 35. Under no circumstance of loading therefore is the "V" pressed together and thus the clamping of the wire 35 in respect of the clamp endangered.

I claim:

1. A clamp of spring or resilient material rotatable in a circular hole, preferably for securing, rod type structures, such as Bowden cables, rods or the like, to sheet or panel type components, characterized in that the clamp is substantially of V-section with two arms (1,2) and a crosspiece or crossbar (10) connecting these, the arms (1,2) each forming two clips (8,9), of which one clip (8, the component clip) corresponding to the thickness of the component (33), has slots (19,20,21) extending transversely to the clamp for accommodating the component (33), and the arms (1,2) of the other clip (9, rod clip) are provided with perforations (13,15,17; 14,16,18) for pushing through the rod type structure (35) and in which the said rod type structure (35) is clamped.

2. A clamp as claimed in claim 1, characterized in that the arms (1,2) are each divided by cuts or incisions (6,7) extending transversely to the clamp into the two clips (8,9) each of which is deformable elastically independently of the other, and the arms (1,2) of the rod clip (9) are provided with holes (13,15,17; 14,16,18) for the insertion of the rod type structure (35), the width of which holes is such that when the arms are pressed together the rod type structure can be pushed in the holes and as the arms spring apart again is clamped securely there.

3. A clamp as claimed in claim 2, characterized in that the holes are made extending longitudinally with three zones of varying width (13,15,17; 14,16,18), of which one outer zone (17,18) produces the clamping effect, the other outer zone (13,14) is of such a width that the rod type structure (35) when the clamp is released from stress can be inserted through both holes, and the zone lying in between comprises a narrowing or constriction (15,16) in relation to the outer zones, which permits, when the arms (1,2) are pressed together, a displacement of a rod type structure from one outer zone to the other.

4. A clamp as claimed in claim 3, characterized in that in the range of the zone (30) effecting the clamping, the holes are bounded by three sides the extensions of which form a triangle.

5. A clamp as claimed in claim 1, characterized in that the slots (19, 20, 21) have lugs (22, 23; 24, 25; 26, 27) bent in to them which starting from the ends of the slots are bent in to these and give the slots an inwardly directed rounding-off, in which connection the ends of the lugs in the mounted condition of the clamp do not touch the wall of the circular hole (34) in the sheet or panel type component (33).

6. A clamp as claimed in claim 1, characterized in that the ends of the arms (1,2) are bent over inwards to form bent-over portions or flanges (4,5).

7. A clamp as claimed in claim 1, characterized in that incisions are made in the form of slots (6, 7) and, for the purpose of forming a widened resiliency zone, terminate in bent-over portions (11, 12) which are directed in the longitudinal direction of the clamp.

8. A clamp as claimed in claim 1, characterized in that incisions are made in the form of slots (6, 7) and extend substantially rectilinearly, and in the vicinity of the crossbar a further slot (28) cutting through this, is provided, lying next to the incisions.

9. A clamp as claimed in claim 1, characterized in that the perforations (38) are provided with resilient lugs (36,37) projecting into them and capable of being bent so far out of the perforations (38) that the rod type structure (35) can be pushed through the perforations (38), and which when they spring back clamp the rod type structure (35) securely.

* * * * *